United States Patent

Phillips et al.

[11] Patent Number: 6,094,849
[45] Date of Patent: Aug. 1, 2000

[54] EDGE-LIT SIGNS

[75] Inventors: James A. Phillips, 19 Spa Hill, London SE19 3TW; Paul N McGlone, Croydon, both of United Kingdom

[73] Assignee: James A. Phillips, London, United Kingdom

[21] Appl. No.: 09/160,799

[22] Filed: Sep. 25, 1998

[30] Foreign Application Priority Data

Sep. 26, 1997 [GB] United Kingdom ................. 97 20 581
Aug. 3, 1998 [GB] United Kingdom ................. 98 16 886

[51] Int. Cl.[7] .............................. G09F 13/22; G09F 13/18
[52] U.S. Cl. ............................................................ 40/546
[58] Field of Search ........................................ 40/546, 544

[56] References Cited

U.S. PATENT DOCUMENTS 3,089,973 5/1963 Herold et al. ............................. 40/544
3,406,475 10/1968 O'Donnell ............................... 40/546
5,485,145 1/1996 Sniff .
5,497,471 3/1996 Tryon et al. .

FOREIGN PATENT DOCUMENTS 0 417 359 A1 3/1991 European Pat. Off. .
42 37 107 C2 5/1994 Germany .
849289 7/1981 U.S.S.R. ................................. 40/544
WO 97/09251 3/1997 WIPO .

*Primary Examiner*—Cassandra H. Davis
*Attorney, Agent, or Firm*—Nixon & Vanderhye P.C.

[57] ABSTRACT

An edge-lit sign comprises a light-transmitting sign board 10 bearing sign information 13 adapted to be illuminated by light entering the board through an edge. At least one strip of electro-luminescent sandwich material 11 is provided which extends along at least a part of the length of the edge of the sign board and is arranged and energizable to illuminate the sign. If the sign is viewable from both sides, it may be formed as a laminate having an opaque central ply. The sign board may alternatively be constituted as a shelf.

3 Claims, 2 Drawing Sheets

EDGE-LIT SIGNS

FIELD OF INVENTION

This invention relates to edge-lit signs formed using a translucent sign board.

BACKGROUND AND SUMMARY OF INVENTION

Edge-lit signs of the type referred to will be familiar to many, at least in England, from their use in cinemas and theatres to indicate exits or emergency exits. Such signs typically have a sign board of glass or transparent plastics material which is etched or otherwise marked with, for example, the word "EXIT". The sign is often suspended from a light box which contains a fluorescent tube or other light source, and light from that source enters the edge of the sign board and is refracted at the etched wording to render it visible in the darkened auditorium.

The light box required for illuminating such a sign is rather bulky and the necessity for its employment inhibits the use of edge-lit signs in many environments where they may be useful.

It is an object of this invention to remedy this disadvantage, and accordingly the present invention provides an edge-lit sign comprising a light-transmitting sign board bearing sign information adapted to be illuminated by light entering the board through an edge, characterised in that there is provided at least one strip of electro-luminescent sandwich material which extends along at least a part of the length of said edge of the sign board and which is arranged and energisable to illuminate the sign.

Electro-luminescent sandwich material can be made in thin strip form, for example about 0.5 mm thick, and 10 mm or less in width. It will be appreciated therefore that such a strip can be used for edge-lighting a sign without the need for a light box or indeed any frame which has significantly greater width than the thickness of the sign board plus any frame lips, and there is no reason why such frame lips should be any thicker than 0.5 mm or so.

In fact, electro-luminescent sandwich material has been available for many years, but its uses to date have been surprisingly limited having regard to its potential advantages in many fields of use.

The present invention is based on an appreciation of these advantages and an insight into ways in which these advantages may be exploited.

Electro-luminescent material with which the present invention is concerned has essentially a layer of a phosphor which is sandwiched between a pair of electrodes of which at least one is translucent. When an electrical potential is applied between the electrodes, the phosphor layer becomes excited and light is emitted. Given a uniform layer, the flux density of the emitted light is uniform over the full extent of the layer. The electrodes and phosphor layer (the "working layers") are sandwiched between outer layers which serve to support and protect the working layers and any other layers which may be present.

The light output can be uniform over a strip length which can be as large or as small as required, and it is economical. A single strip may be used along just one edge of a sign board, or it may surround substantially the whole periphery of the board. Alternatively, a plurality of strips may be laid up against different sections of the periphery of the board. It will be appreciated that if an electro-luminescent strip is to be bent at a corner of the board, the radius of curvature of the strip at that corner should not be so small as to give significant risk of breakage to damage to the strip such as would render it inoperable. It is presently believed that any radius of curvature above 1 cm could be acceptable given a suitable choice of the supporting plies of the electro-luminescent sandwich.

The sign board may be formed of glass or plastics material. If the board is intended for viewing from both faces, it is suitable to form the board as a laminate which has a central opaque ply. This allows such asymmetrical signs as EXIT signs to be read from both signs without the display becoming garbled.

Of course the sign could be some form of symbolic direction indicating sign or other sign intended for reading from both sides, or it could be intended for positioning so that it could be read from one side only, in which cases the board could be constituted by a simple sheet.

In some particularly preferred embodiments of the invention, the sign board is formed as a shelf. In such embodiments, the display material might for example be constituted by the brand name of goods displayed on the shelf.

In such embodiments it may be convenient to mount the electro-luminescent material so that it is carried by a support for the shelf rather than by the shelf itself. In this way, the lighting apparatus may be set up permanently, and shelves substituted as desired without the inconvenience of having to dis-connect and re-connect the lighting strip to a source of current.

The required display material is suitably mechanically etched or moulded into the sign board. The advantages of this can be great, since in particular, the etching or moulding can be such as to cause the etched or moulded design to refract light emitted by the electro-luminescent strip and thus the actual display material itself may be caused to emit light, rather than being merely back-lit. This affords the designer of the display material a much greater freedom to exercise his or her talents in order to attract attention to the signed message or thing, and this is particularly important and advantageous in the field of advertising.

The electro-luminescent sandwich itself may be directly applied to the sign board for forming the display, and the electro-luminescent strip material may thus be in the form of a sandwich having a ply which is coated with an adhesive and which is covered with a peelable protective covering prior to use.

The phosphor layer of electro-luminescent material for use in the invention may be excited by an applied potential of less than 150 v, and such potential may be as low as for example 5 v which is advantageous from the point of view of safety and convenience if it is desired to power the display using batteries. The power may be AC or DC, and it may be supplied from the mains (for example via a transformer) or from batteries. The use of a pulsed supply to cause flashing of the phosphor will have particularly advantageous attention-seeking properties.

BRIEF DESCRIPTION OF THE ACCOMPANYING DRAWINGS

A preferred embodiment of the invention will now be described with reference to the accompanying diagrammatic drawings in which.

DETAILED DESCRIPTION OF THE PREFERRED EXEMPLARY EMBODIMENTS

Figure 1:
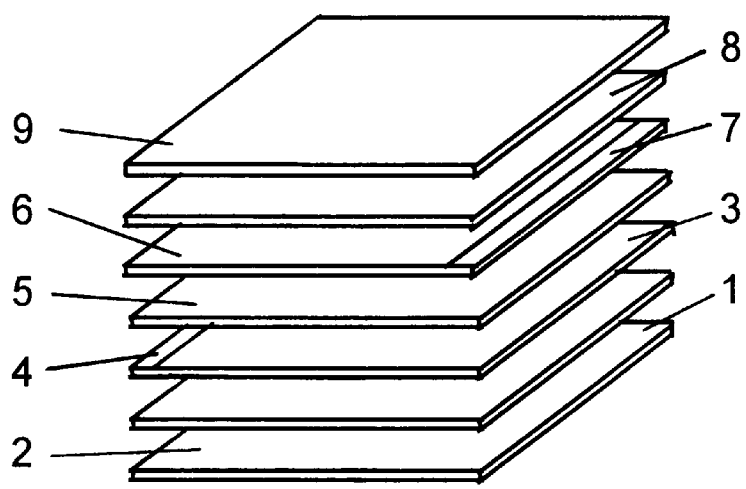
FIG. 1 is an exploded view of a sandwich of electro-luminescent strip material suitable for use in accordance with the invention.

In FIG. 1, electro-luminescent strip material comprises a backing strip 1 which acts as a support. Supported by the backing strip 1 is an optional reflective layer 2 on top of which is a back electrode 3 arranged to be fed by a bus strip 4. In such an arrangement, the back electrode 3 would be translucent, or there would be no purpose to the reflective layer 2. In an alternative arrangement, a reflective layer of a metal may itself constitute the back electrode. The back electrode supports a phosphor layer 5 which is designed to emit light when energised by the back electrode 3 and a transparent front electrode 6 itself fed with current by means of a bus strip 7. The front electrode 6 is covered by a front ply 8, and an optional peelable protective covering 9.

The bus strips 4 and 7 are suitably formed of copper, which provides a good compromise between cost and conductivity, and translucent electrodes are suitably formed as a coating layer of doped tin oxide or indium tin oxide. Such layers are conveniently formed by a vacuum deposition technique.

In the embodiment shown, the backing strip 1 is of a reasonably durable material, as is the protective covering, so that they can resist the rigours of day-to-day handling prior to use in a display, and, in the case of the backing layer, during such display. The backing strip 1 may for example be formed of a polyamide. For display, the protective covering 9 is peeled away, and the front ply 8 is presented to the edge of a sign which is to be illuminated. The front ply 8 is formed of a highly plasticised translucent material which may be coated with adhesive so that it will be self-adherent to the edge of a sign board. It may for example be formed from a polymeric material such as polyvinyl chloride.

The front ply 8 may be clear and transparent, it may incorporate pigments and/or dyes, or it may incorporate fillers which impart some opalescent or other special effect on its optical properties.

Figure 2A:
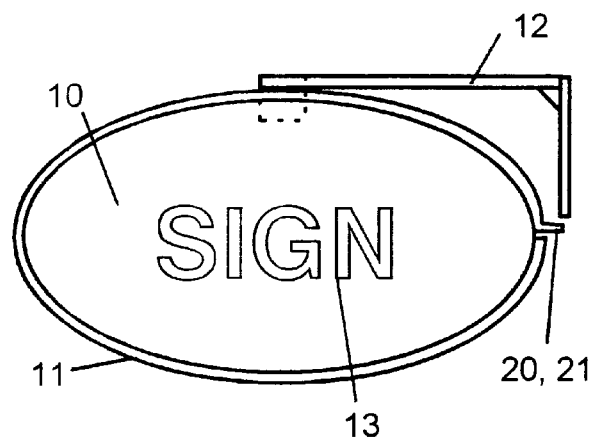
FIGS. 2a and 2b are respectively face and edge views of a sign board incorporating a strip of electro-luminescent material.

FIG. 2 shows a sign board 10 which is illuminated by a strip 11 of electro-luminescent material glued to its edge and supported by a bracket 13. It will be noted that the sign is unframed, though a frame of light construction could be used if desired. It will be seen that the strip 11 extends over substantially the whole periphery of the sign board 10, and it is activatable to illuminate the sign board and the sign material 13 which it carries.

Figure 2B:
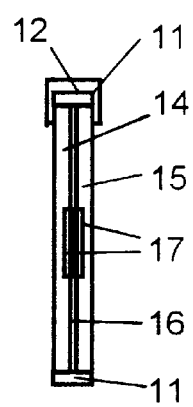

In order that sign material 13 may be viewed from both sides of the board without appearing garbled, and as shown in FIG. 2b, the sign board 10 is formed from two sheets 14, 15 of transparent material, such as polymethyl methacrylate, which are laminated together via an opaque layer 16. The sign material 13 is formed by mechanically or chemically etching the surfaces of both the transparent sheets 14, 15 as represented at 17. This etching 17 is preferably at the interior of the completed sign board so that it is protected from damage and dirt.

Figure 3:
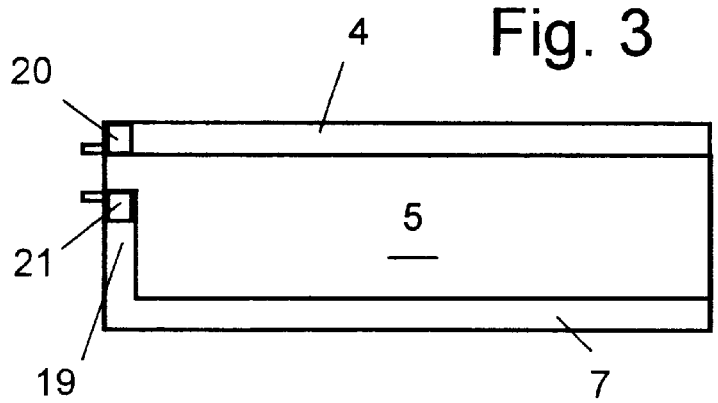
FIG. 3 is a plan view of an end of a strip of electro-luminescent material showing connectors for the supply of electrical power.

FIG. 3 shows an end portion of a strip of electro-luminescent material which incorporates an electro-luminescent phosphor layer 5 which is excitable by a pair of electrodes (not shown) which are in turn fed by bus strips 4 and 7 (compare FIG. 1). The bus strip 7 is extended along the end of the strip of electro-luminescent material as indicated by reference numeral 19, and the end of the bus strip 4 and the bus strip extension 19 are provided with terminal pins 20, 21 respectively for connection of the two bus strips 4, 7 into an electric circuit for the supply of current.

In other embodiments, the sign is supported horizontally and forms a shelf. In such embodiments the sign display material etched or engraved into the shelf may be confined to a front marginal region.

Figure 4:
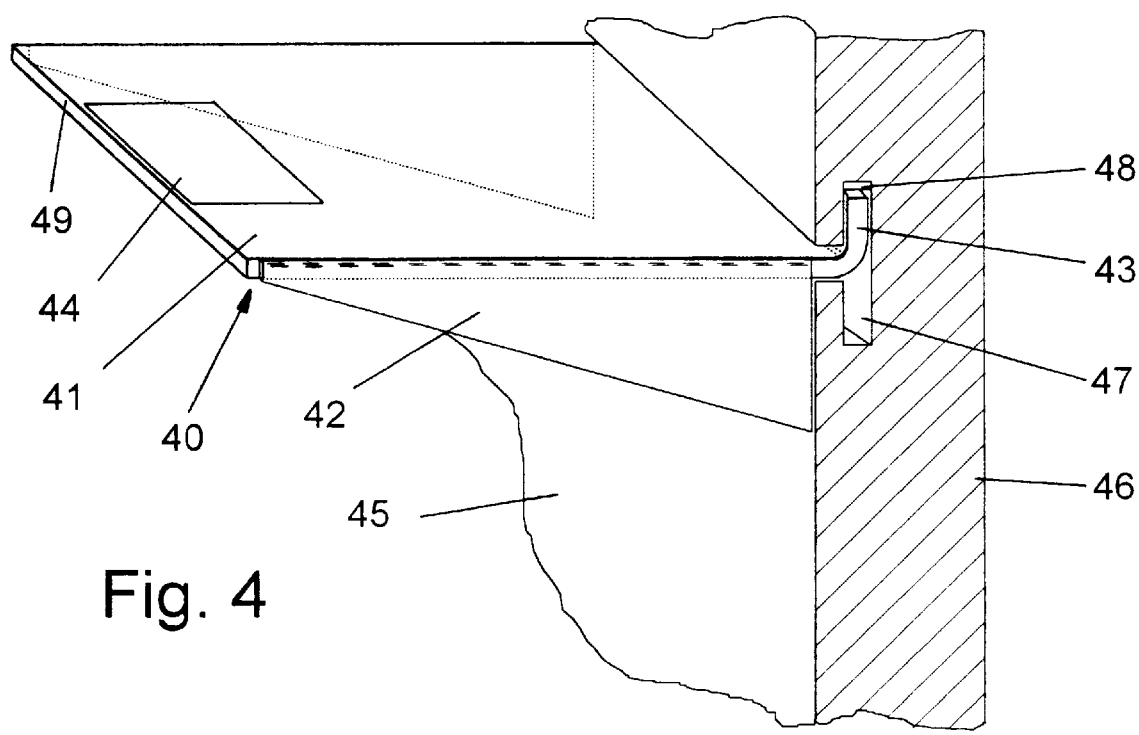
FIG. 4 is a perspective view of a sign board constituted as a shelf which is mounted on a support.

In one such embodiment of the invention which is shown in FIG. 4, the sign board is constituted as a shelf 40 comprising a sheet 41 providing a support surface for example for the display of retail trade goods (not shown). The shelf 40 has side flanges 42 and an upwardly extending rear lip 43 formed by bending up the rear margin of the sheet 41. The shelf is provided with display or advertising material 44 which is translucent in nature and constituted by surface irregularities such as engraving. A support member 45 comprises a board 46 which is provided with one or more undercut slots 47 for receiving and retaining the rear lip 43 of a shelf 40. The shelf 40 is retained in position by the engagement of the rear lip 43 of the shelf with the undercut of the slot 47 and by the side flanges 42 which bear against the front surface of the support board 46.

A strip 48 of electro-luminescent material is provided lining the upper face of the undercut slot 47 so that it is apt to illuminate the edge face of the upwardly extending lip 43 at the rear of the shelf 40. Light entering the lip 43 will be conducted into the horizontal sheet portion 41 of the shelf 40, and will thus illuminate the display or advertising material 44 and also the front edge face 49 of the sheet 41.

The undercut slot 47 is shown as being of T-section. In the embodiment illustrated, the slot 47 was formed using a rotary router to cut into MDF (medium density fibre) board. In other embodiments, the support 46 may be extruded with ready-formed slots such as 47 which might be of L-shape in cross section. Among extrudable materials envisaged for use in forming such a support are acrylic and other resins, and aluminum and aluminum alloys.

We claim:

1. An edge-lit sign comprising a light-transmitting sign board bearing sign information adapted to be illuminated by light entering the board through an edge, wherein said sign board includes at least one strip of electro-luminescent sandwich material which extends along at least a part of the length of said edge of the sign board and which is arranged and energizable to illuminate the sign, and wherein said sign is formed as a shelf.

2. An edge-lit sign according to claim 1, wherein the board is formed as a laminate which has a central opaque ply and incorporates sign information on each side of that ply.

3. An edge-lit sign according to claim 1, wherein said strip of electro-luminescent sandwich material is carried by a support for said shelf.

* * * * *